Aug. 11, 1953  P. G. COX  2,648,438
FILTER
Filed Oct. 15, 1947
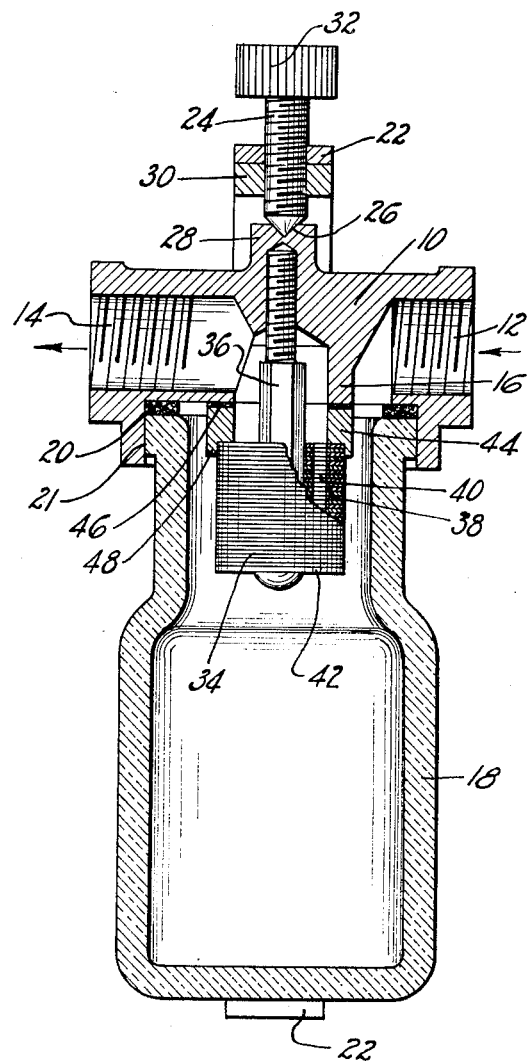
INVENTOR.
PARKER G. COX
BY Patented Aug. 11, 1953

2,648,438

UNITED STATES PATENT OFFICE 2,648,438

FILTER

Parker G. Cox, Grosse Point Farms, Mich., assignor to Bendix Aviation Corporation, South Bend, Ind., a corporation of Delaware Application October 15, 1947, Serial No. 780,067

4 Claims. (Cl. 210—1.5)

The present invention relates to fluid filters and more particularly to filters adapted to remove particles of free iron or steel from a stream of fluid conveyed in a conduit.

One of the principal objects of the present invention is to provide a device for filtering various kinds of fluids such as gasoline, fuel oil, coolants and the like, to remove solid matter, including minute particles of free iron and steel, from the fluid.

Another object of the invention is to provide a fluid filter having, in addition to the filter element therein, a means for removing particles of iron from the fluid either before or after the fluid passes through the filter element.

A further object of the invention is to provide a simplified magnetic fluid filter which can be readily assembled for use or disassembled for cleaning.

Still another object of the invention is to provide a magnetic filter wherein the magnetic means and the filter elements are held in operative position by the same securing means.

The present filtering device is designed principally for use in filtering gasoline, fuel oils and lubricating oils for marine engines, industrial units, trucks, busses, passenger cars and outboard motors. The filter is adapted to be installed at the carburetor, at the fuel pump, or between the fuel tank and fuel pump. The present device is also adapted for filtering oil for industrial burners, coolants for refrigeration equipment and fluid for hydraulic machinery. The magnetic feature of the present filter is of particular importance in equipment where magnetic control valves are used to control fluid flow, the magnetic filter, of course, being on the upstream side of the valve. Further applications and advantages of the present invention will appear from the following description and accompanying drawing, in which one specific embodiment thereof is disclosed.

Referring to the drawing, wherein a vertical cross-section of a filtering device is shown, numeral 10 designates a filter head in which are provided a fluid inlet 12 and fluid outlet 14, said fluid inlet and outlet being separated from one another in the filter head by a wall 16 formed integrally with the internal portion of said head. The inlet and outlet are threaded internally to receive suitable fittings for installation of the filter in a fuel line or the like. A fluid bowl 18 is seated on a gasket 20 in an annular recess 21 at the bottom of the filter head 10 and is secured in place by a metal bracket 22 which engages the bottom of bowl 18 on opposite sides thereof and extends over the top of the filter head. The bracket is held in place on the filter by screw 24 which extends through a hole in the uppermost portion of said bracket and into a V-shaped recess 26 in boss 28 of the filter head and is secured therein by a nut 30 disposed on the under side of the bracket. The screw is provided with a knurled head 32 to facilitate tightening or loosening of the screw when the filter is assembled or disassembled. When screw 24 is tightened, bracket 22 draws the sealing surface of bowl 18 into fluid-tight relationship with gasket 20 and the filter head 10.

While the fuel bowl is shown in the drawings as consisting of glass or the like, it may be made of any other suitable material, and in certain fluid systems where high pressures may be encountered, a metal bowl may be desirable.

A filter element 34, which is shown as an edge type filter though the invention is not limited to any particular type, is mounted on a stem 36, the upper end of which is threaded into a hole in the internal portion of the filter head 10. The filter shown contains several vertical fluid passages 38 spaced uniformly around stem 36, though spaced therefrom by an annular hub 40. A plate 42 is riveted on the lower end of stem 36 and serves as a closure for the lower end of vertical passages 38 as well as a support for the washers comprising the filter element.

Mounted on the upper end of the filter element and supported thereby, is a ring-shaped permanent magnet 44 held in fluid-tight relationship with gasket 46 by stem 36. Gasket 46 is provided primarily for the purpose of insulating the magnet from the filter head and therefore may be dispensed with if the filter head is made of non-magnetic material. Insulation is normally not required between the magnet and the filter element since the element is usually made of non-magnetic material such as brass. An annular flange 48 on the lower side of magnet 44 extends over the side of the filter element and retains said magnet in alignment with said element and with the port for the fluid outlet in the filter head.

In the operation of the present filtering device, fluid such as fuel flows through inlet 12 downwardly into bowl 18 in the vicinity of magnet 44 where the particles of free iron or steel entrained in the fluid are attracted to said surface and held there from further movement with the fluid. The fluid then passes through the interstices of the filter element 34, upwardly through the vertical passages 38, thence passes the internal surface of the magnet and out of the filter through the outlet 14. It is seen that the fluid is subjected to the influence of the magnet both on its way into and on its way out of the filter, thus doubling the exposure of the fluid to the influence of the magnet so that any minute particles of iron or steel which fail to be removed as they pass into bowl 18 are removed as they pass from the filtering device.

Although only one embodiment of the invention has been illustrated herein, various changes in the form of the filter device may be made and various types of filter elements may be used to suit requirements.

I claim:

1. A device for filtering fluids comprising a filter head having a fluid inlet conduit and a fluid outlet conduit, in close proximity to one another, a bowl with which said inlet and outlet conduits communicate, a hollow filter element, a ring-shaped permanent magnet for removing particles of iron and steel from the fluid, and a means connected to said head for securing said element and said magnet in place in said bowl at the entrance to said outlet conduit with the hollow interior of each in direct communication with said outlet conduit and with the magnet functionally positioned between said element and said entrance, whereby the fluid being filtered is exposed to the outside of said magnet before passing through the filter element and exposed to the inside of said magnet after passing through said element.

2. A device for filtering fluids comprising a filter head having a fluid inlet conduit and a fluid outlet conduit in close proximity to one another, a bowl depending from said head with which said inlet and outlet conduits communicate, a filter element having at least one longitudinal passage therein for fluid filtered by said element, a ring-shaped permanent magnet for removing particles of iron and steel from said fluid, a means connected to said head for securing said element and said magnet in place in said bowl at the entrance to said outlet conduit with the hollow interior of each in direct communication with said outlet conduit and with the magnet functionally positioned between said element and said entrance, whereby the fluid being filtered is exposed to the outside of said magnet as it enters the fluid bowl and to the inside of said magnet as it flows from said passage to the fluid outlet conduit.

3. A device for filtering fluids comprising a fluid chamber having a fluid inlet port and a fluid outlet port in close proximity to one another, a filter element in said chamber in direct communication with said outlet port, a ring-shaped permanent magnet interposed between said element and said outlet port, and a means for directing the fluid entering said chamber around the outside of said magnet in proximity thereto.

4. A device for filtering fluids comprising a fluid chamber, a fluid outlet port for said chamber, a filter element having a fluid passage in direct communication with said port, a ring-shaped permanent magnet around said port interposed between said element and port, and a fluid inlet port for said chamber adapted to direct the fluid entering said chamber around the outside of said magnet in proximity thereto.

PARKER G. COX.

References Cited in the file of this patent

UNITED STATES PATENTS

| Number | Name | Date |
| --- | --- | --- |
| Re. 16,932 | Rasey | Apr. 10, 1928 |
| 1,425,366 | Chapman | Aug. 8, 1922 |
| 1,768,550 | Fekete | July 1, 1930 |
| 1,996,106 | Hall | Apr. 2, 1935 |
| 2,437,221 | Cox et al. | Mar. 2, 1948 |

FOREIGN PATENTS

| Number | Country | Date |
| --- | --- | --- |
| 272,784 | Great Britain | June 23, 1927 |
| 337,759 | Great Britain | May 3, 1929 |